United States Patent
Couleur et al.

(10) Patent No.: US 11,086,378 B1
(45) Date of Patent: Aug. 10, 2021

(54) RECONFIGURABLE MULTI-PHASE POWER CONVERTER

(71) Applicant: Apple Inc., Cupertino, CA (US)

(72) Inventors: Michael Couleur, Rottach Egern (DE); Nicola Rasera, Munich (DE); Siarhei Meliukh, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/784,605

(22) Filed: Feb. 7, 2020

(51) Int. Cl.
*H02M 3/158* (2006.01)
*G06F 1/28* (2006.01)

(52) U.S. Cl.
CPC .............. *G06F 1/28* (2013.01); *H02M 3/158* (2013.01)

(58) Field of Classification Search
CPC . H02M 2001/0003; H02M 2001/0006; H02M 1/084; H02M 1/096; H02M 3/156; H02M 3/158; H02M 3/1584; G06F 1/26; G06F 1/266
See application file for complete search history.

(56) References Cited

U.S. PATENT DOCUMENTS

| | | | |
|---|---|---|---|
| 8,680,830 B2* | 3/2014 | Kudo | H02M 3/1584 323/283 |
| 9,000,786 B2 | 4/2015 | Luo et al. | |
| 10,727,746 B1* | 7/2020 | Yen | H02M 1/084 |
| 10,778,101 B1* | 9/2020 | Schmitz | H02M 3/1584 |
| 10,884,043 B1* | 1/2021 | Couleur | H03K 7/08 |
| 2017/0090501 A1 | 3/2017 | Fletcher et al. | |
| 2018/0175734 A1* | 6/2018 | Gherghescu | H02M 3/1584 |
| 2019/0271998 A1 | 9/2019 | Sisson et al. | |

FOREIGN PATENT DOCUMENTS

WO    2004025314    3/2004

* cited by examiner

*Primary Examiner* — Matthew V Nguyen
(74) *Attorney, Agent, or Firm* — Kowert, Hood, Munyon, Rankin & Goetzel, P.C.

(57) ABSTRACT

A power converter circuit that includes a switch circuit, and multiple phase and amplifier circuits, may generate a voltage level on a regulated power supply node of a computer system. The amplifier circuits may generate respective demand currents using a voltage level of the regulated power supply node and a reference voltage. In response to activation of a multi-phase operating mode, the switch circuit may short the outputs of the amplifier circuits to generate a common demand current. The multiple phase circuits may sequentially source current to regulated power supply node using the common demand current.

20 Claims, 10 Drawing Sheets

RECONFIGURABLE MULTI-PHASE POWER CONVERTER

BACKGROUND

Technical Field

Embodiments described herein relate to integrated circuits, and more particularly, to techniques for generating regulated power supply voltages.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulated power supply voltage level are disclosed. Broadly speaking, a power converter circuit includes multiple phase circuits coupled to a regulated power supply node via corresponding inductors, and multiple amplifier circuit may be configured to generate, using a reference voltage level a voltage level of the regulated power supply node, respective demand currents on corresponding amplifier nodes. The power converter circuit may also include a switch circuit coupled between the amplifier circuits and the phase circuits may be configured, in response to an activation of a multi-phase operating mode, to short the amplifier nodes to generate a common demand current using the respective demand currents. The multiple phase circuits may be configured, in response to the activation of the multi-phase operating mode, to sequentially source current to the regulated power supply node using the common demand current. In other embodiments, the phase circuits may be further configured, in response to a de-activation of the multi-phase operating mode, to independently source current to the regulated power supply node using respective ones of the plurality of demand currents.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple power converter circuits configured to generate regulated voltage levels for various power supply signals. Such power converter circuits may employ regulator circuit that include both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple phase circuits coupled to a regulated power supply node via corresponding inductors. Each of the phase circuits may be periodically activated to source current to and sink current from a corresponding inductor in order to maintain a desired voltage level on power supply node.

During the design of a computer system, many circuit blocks, including voltage regulator and power converter circuits, may be designed in parallel. As such, specific requirements current requirements for some circuit blocks included in the computer system may not be known until the portions of the design are complete. Changes in current requirements can result in re-work or re-design of the voltage regulator and power converter circuits, which may result in additional time to complete the design of the computer system.

The embodiments illustrated in the drawings and described below may provide techniques for operating a power converter circuit in selected ones of multiple operating modes, thereby allowing a voltage regulator or power converter circuit to be quickly re-configured to meet current load requirements, reducing the amount of additional time to complete the design of the computer system.

Figure 1:
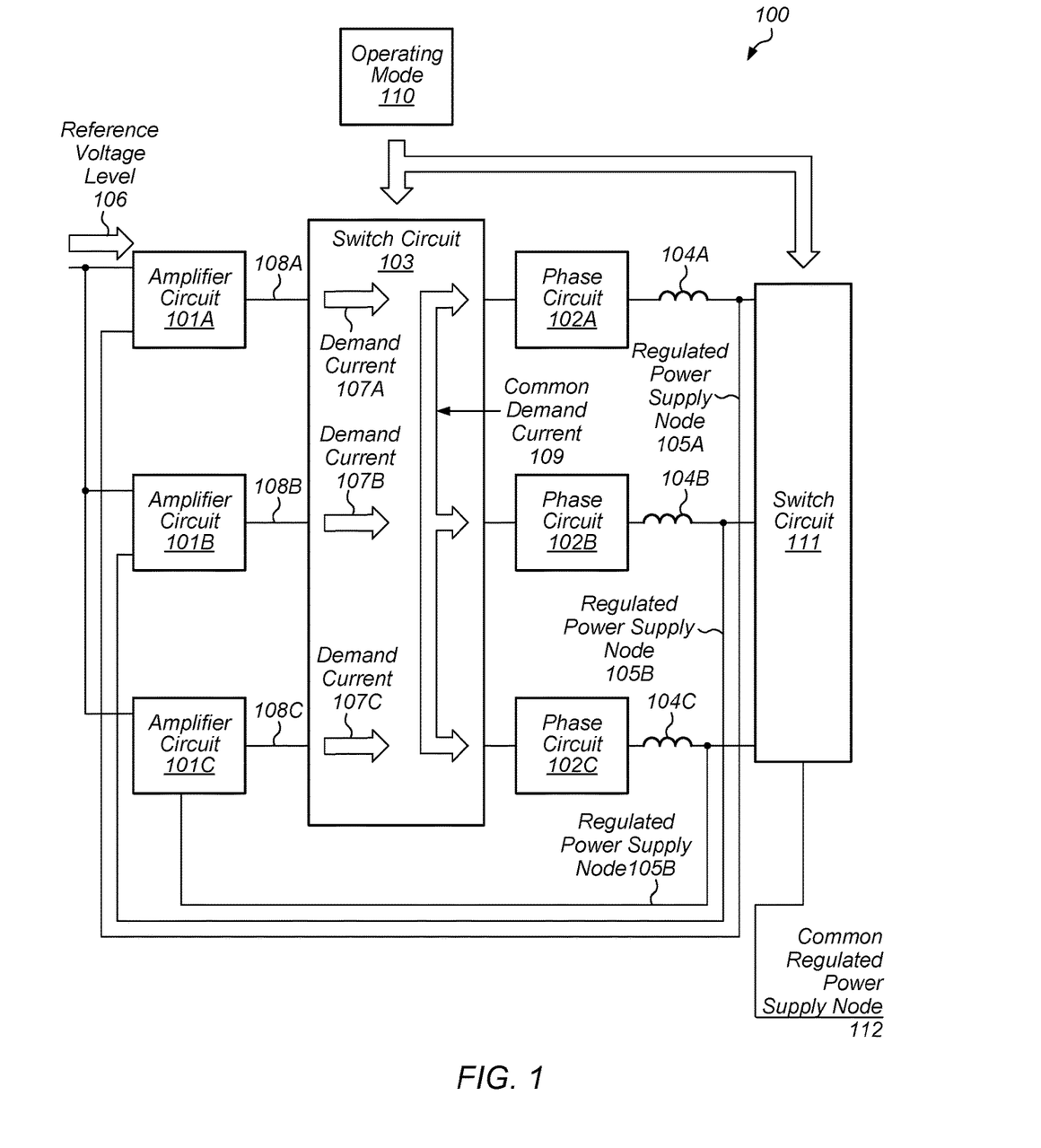
FIG. 1 is a block diagram of an embodiment of a power converter circuit.

A block diagram depicting an embodiment of a power converter circuit is illustrated in FIG. 1. As illustrated, power converter circuit 100 includes amplifier circuits 101A-101C, phase circuits 102A-102C, switch circuit 103, switch circuit 111, and inductors 104A-104C.

Phase circuit 102A is coupled to regulated power supply node 105Aa via inductor 104A. In a similar fashion, phase circuits 102B and 102C are coupled to regulated power supply nodes 105B and 105C via inductors 104B and 104C, respectively. Although three phase circuits are depicted in the embodiment of FIG. 1, in other embodiments, any suitable number of phase circuits may be employed.

Amplifier circuit 101A is configured to generate demand current 107A on node 108A using reference voltage level 106 and a voltage level of regulated power supply node 105A. Likewise, amplifier circuit 101B is configured to generate demand current 107B on node 108B using reference voltage level 106 and a voltage level of regulated power supply node 105A. while amplifier circuit 101C is configured to generate demand currents 107C on node 108C using reference voltage level 106 and a voltage level of regulated power supply node 105C. It is noted that in other embodiments, different number of amplifier circuits may be employed.

Switch circuit 103 is coupled between amplifier circuits 101A-101C, and phase circuits 102A-102C. The operation of switch circuit 103 may be based on an operating mode 110 of power converter circuit 100. As used and described herein, an operating mode of a power converter circuit refers to how individual ones of multiple phase circuits are used to generate a voltage level on a regulated power supply node. Such operating modes may include a mode in which each phase circuit operates independently of the other phase circuits (referred to as "single phase operating mode"), and a mode in which the phase circuits operate in a sequential fashion.

In response to a selection of a multi-phase operating mode, switch circuit 103 is configured to short nodes 108A-108C, to generate common demand current 109 using demand currents 107A-107C. Phase circuits 102A-102C are further configured, in response to the selection of the multi-phase operating mode, to sequentially source current to the regulated power supply node, wherein each one of phase circuits 102A-102C is configured to use the common demand current.

Alternatively, in response to a selection of a single-phase operating mode, switch circuit 103 does not short nodes 108A-108C, leaving demand currents 107A-107C as separate currents. Phase circuits 102A-102C are further configured to, in response to the selection of the single-phase operating mode, to source current to the regulated power supply node, wherein each one of phase circuits 102A-102C is configured to use a respective one of demand currents 107A-107C. It is noted that although two operating modes are described in reference to FIG. 1, in other embodiments, other operations modes, e.g., some of phase circuits 102A-102C operating in a multi-phase fashion, while others are operating in a single-phase fashion, are possible and contemplated.

Switch circuit 111 is coupled inductors 104A-C and common regulated power supply node 112. Like switch circuit 103, the operation of switch circuit 111 may be based on an operating mode 110 of power converter circuit 100. In response to a selection of a multi-phase operating mode, switch circuit 111 is configured to short regulated power supply nodes 105A-105C to common regulated power supply node 112, allowing power converter circuit 100 to operate as a multi-phase power converter circuit configured to generate a particular voltage level on common regulated power supply node 112. In some embodiments, switch circuit 111 may include multiple switch devices, e.g., pass gates or other suitable circuits, configured to selectively couple a particular one of regulated power supply nodes 105A-105C to common regulated power supply node 112.

In response to a selection of a single-phase operating mode, switch circuit 111 is configured to de-couple each of regulated power supply nodes 105A-105C from common regulated power supply node 112. By de-coupling regulated power supply nodes 105A-105C from common regulated power supply node, phase circuit 102A-102C may be configured to generate respective voltage levels on regulated power supply nodes 105A-105C. In such a situation, respective voltage levels of each of regulated power supply nodes 105A-105C may be used as separate power supply voltage levels. It is noted that in various embodiments, the respective voltage levels of regulated power supply nodes 105A-105C may be different when power converter circuit 100 is operating in the single-phase operating mode.

In some embodiments, selection of the multi-phase operating mode may be made during a design process for a computer system including power converter circuit 100. In such cases, information indicative of a selected operating mode may be stored in a non-volatile or other suitable memory. Power converter circuit 100 may be configured to use the previously stored information in order to determine its operating mode. By storing information indicative of the operating mode, a single power converter design may be re-configured to one of multiple operating modes in order to meet current and power requirements of various load circuits.

In other cases, the selection of the multi-phase operating mode may be made during operation using operating characteristics of one or more load circuits whose power terminals are coupled to common regulated power supply node 112. By using the operating characteristics of such load circuits, the operation of a power converter circuit may be adjusted to accommodate changes in temperature, performance, etc., of the load circuits.

Figure 2:
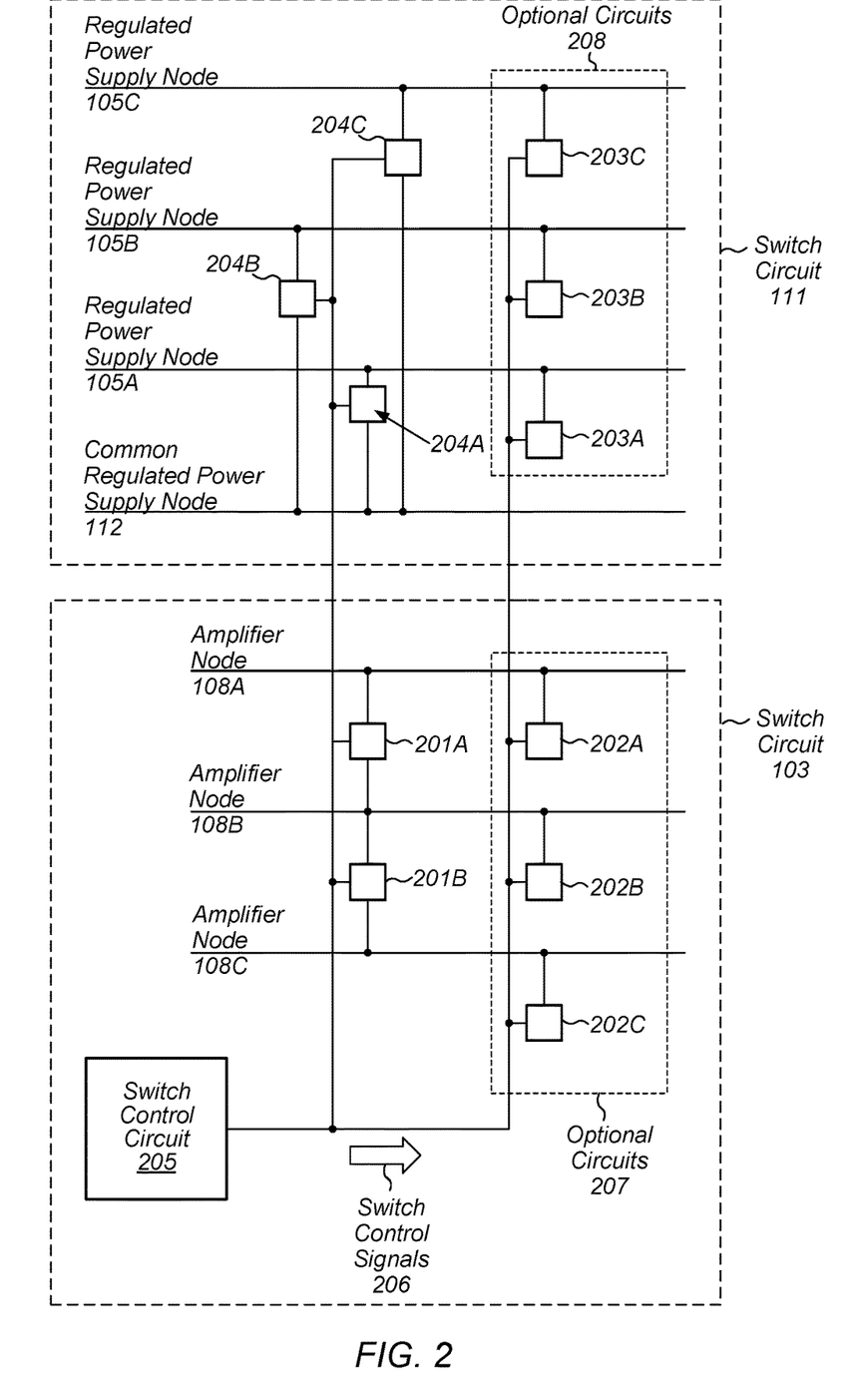
FIG. 2 is a block diagram of embodiments of a switch circuits used in a power converter circuit.

Switch circuits 103 and 111 may be implemented in a variety of fashions. Respective embodiments of switch circuits 103 and 111 are depicted in FIG. 2. As illustrated, switch circuit 103 includes switch devices 201A and 201B, switch control circuit 205, and optional circuits 203, which include capacitor load circuits 202A-202C, and switch circuit 111 includes switch devices 204A-204C, and optional circuits 208, which include capacitor load circuits 203A-203C.

Switch device 201A is coupled between node 108A and node 108B, while switch device 201B is coupled between nodes 108B and 108C. Both switch devices 201A and 201B are controlled by switch control signals 206. As described below in more detail, the generation of switch control signals 206 may be based, at least in part, on an operating mode of power converter circuit 100. For example, during single-phase operation, switch devices 201A and 201B are open, isolating nodes 108A-C. During multi-phase operation, switch devices 201A and 201B are closed, shorting nodes 108A-C. By shorting nodes 108A-C, demand currents 107A-C are combined into common demand current 109, which allow for phase circuits 102A-C to operate together in a multi-phase fashion.

Switch device 204A is coupled between regulated power supply node 105A and common regulated power supply node 112. In a similar fashion, switch device 204B is coupled between regulated power supply node 105B and common regulated power supply node 112, while switch device 204C is coupled between regulated power supply node 105C and common regulated power supply node 112. Switches devices 204A-204C are controlled by switch control signals 206. During multi-phase operation, switch devices 204A-204C are closed shorting regulated power supply nodes 105A-105C to common regulated power supply node 112. During single phase operation, switch devices 204A-204C are open, isolating regulated power supply nodes 105A-105C from common regulated power supply node 112.

In some embodiments, differences in respective capacitive loads on nodes 108A-108C and regulated power supply nodes 105A-105C in different modes of operation can result in improper operation of power converter circuit 100. In such cases, capacitor loads circuits 202A-202C and 203A-203C may be employed to modify the capacitive loads on the aforementioned nodes.

Capacitor load circuits 202A-202C are coupled to nodes 108A-108C, respectively. In a similar fashion, capacitor load circuits 203A-203C are coupled to regulated power supply nodes 105A-105C, respectively. As described below in more detail, a given one of capacitor load circuits 202A-202C is configured to couple a capacitor to a corresponding one of nodes 108A-108C, and a given one of capacitor load circuits 203A-203C is configured to couple a capacitor to a corresponding one of regulated power supply nodes 105A-105C. The additional capacitive load on nodes 108A-108C and regulated power supply nodes 105A-105C may be used to modify a position of a pole in the transfer function of power converter circuit 100, thereby maintaining stability of a feedback loop of the power converter circuit 100. It is noted that the capacitor values contributed to their respective nodes by capacitor load circuits 202A-202C and 203A-203C may be different.

Switch control circuit 205 is configured to generate switch control signals 206. As described below in more detail, switch control circuit 205 may be a particular embodiment of a logic circuit, sequential logic circuit, or any suitable combination thereof. In some cases, switch control circuit 205 may include a memory or other storage circuit configured to store information indicative of a selection operating mode of power converter circuit 100.

Figure 3:
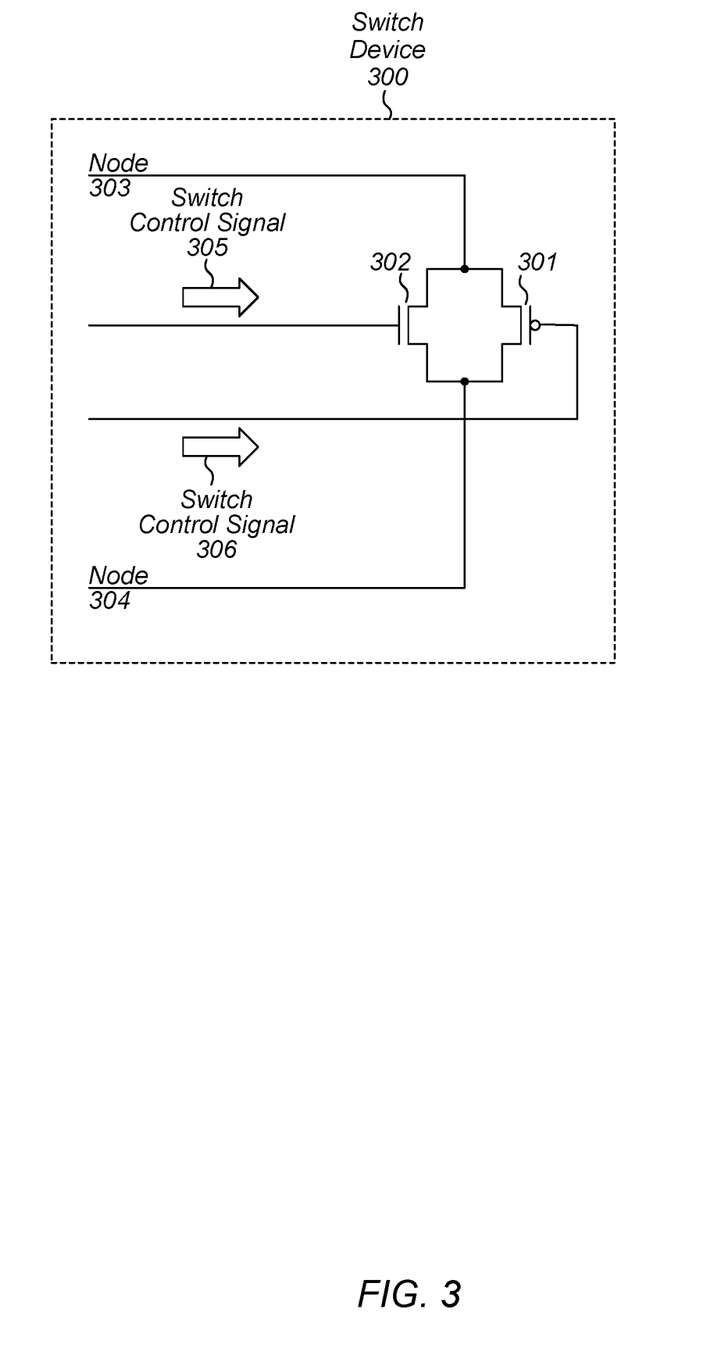
FIG. 3 is a block diagram of a switch device.

Switch devices 201A-201B and 204A-204C may be implemented according to various design styles. A particular embodiment of switch devices 201A-201B and 204A-204C is depicted in FIG. 3. As illustrated, switch device 300 includes devices 302 and 301.

Device 301 is coupled between node 303 and node 304, and is controlled by switch control signal 306. In a similar fashion, device 302 is coupled between node 303 and node 304, and is controlled by switch control signal 305. In various embodiments, node 303 may correspond to any of nodes 108A-C, and node 304 may correspond to any of nodes 108A-C as illustrated in FIG. 1. Alternatively, node 303 may correspond to any of regulated power supply nodes 105A-105C, and node 304 may correspond to common regulated power supply node 112. In some embodiments, switch control signals 305 and 306 may be included in switch control signals 206 as illustrated in FIG. 2.

Device 301 may, in various embodiments, be a particular embodiment of a p-channel metal-oxide semiconductor field-effect transistor (MOSFET) or other suitable transconductance device configured to couple node 303 to node 304, in response an assertion of switch control signal 306. For example, in response to a voltage level of switch control signal 306 being transitioned to a voltage level at or near ground potential, device 301 may activate, coupling node 303 to node 304 by providing a conduction path between the two nodes. When not activated, only leakage current may flow between nodes 303 and 304 through device 301.

Device 302 may, in some embodiments, be a particular embodiment of an n-channel MOSFET configured to couple node 303 to node 304, in response to an assertion of switch control signal 305. For example, in response to a voltage level of switch control signal 305 being at or near a voltage level of a power supply node, device 302 may activate coupling node 303 to node 304 by providing a conduction path between the two nodes. When device 302 is not active, only a leakage current may flow through device 302, effectively isolating node 303 from node 304.

It is noted that the, in some cases, switch control signals 305 and switch control signal 306 may be inverses of each other. Although only two devices are depicted in the embodiment illustrated in FIG. 2, in other embodiments, any suitable number of devices may be employed.

Figure 4:
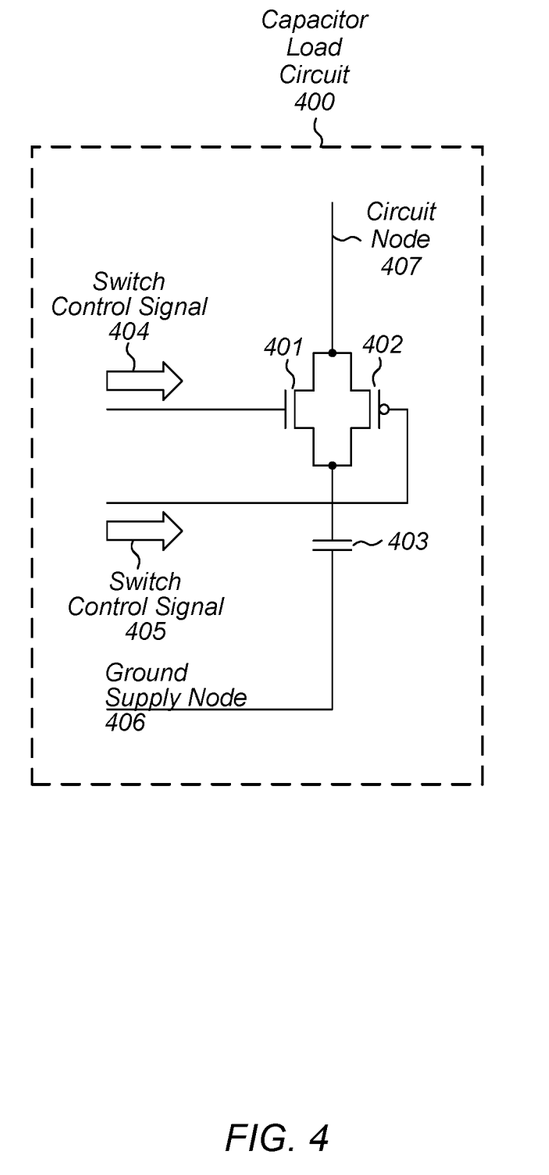
FIG. 4 is a block diagram of an embodiment of a capacitor load circuit.

As described above in regard to FIG. 2, capacitor load circuits may be employed to adjust an amount of capacitance on nodes 108A-108C as well as regulated power supply nodes 105A-105C. Such capacitor load circuits may be implemented according to a variety of design styles. A particular embodiment of a capacitor load circuit is depicted in FIG. 4. As illustrated, capacitor load circuit 400 includes devices 401 and 402, and capacitor 403.

Device 401 is coupled between circuit node 407 and capacitor 403, and may be a particular embodiment of an n-channel MOSFET. In a similar fashion, device 402, which may be a particular embodiment of a p-channel MOSFET, is couple between circuit node 407 and capacitor 403. In various embodiments, circuit node 407 may correspond to any of nodes 108A-108C or any of regulated power supply nodes 105A-105C.

Capacitor 403 is coupled to device 401 and device 402, as well as ground supply node 406. In various embodiments, capacitor 403 may be a metal-oxide-metal structure or any other suitable structure available in a semiconductor manufacturing process. Although only a single capacitor is depicted in the embodiment of FIG. 4, in other embodiments, any suitable number of capacitors may be employed.

Devices 401 and 402 are activated using switch control signals 404 and 405, respectively. For example, in response to a value of switch control signal 404 being a logical-1 and a value of switch control signal 405 being a logical-0, devices 401 and 402 may be both active, coupling capacitor 403 to circuit node 407. By coupling capacitor 403 to circuit node 407, a value of the capacitance associated with circuit node 407 may be increased. In a similar fashion, capacitor 403 may be decoupled from circuit node 407 by changing the values of switch control signals 404 and 405. It is noted that in various embodiments, switch control signals 404 and 405 may be included in switch control signals 205 as depicted in FIG. 2.

Figure 5:
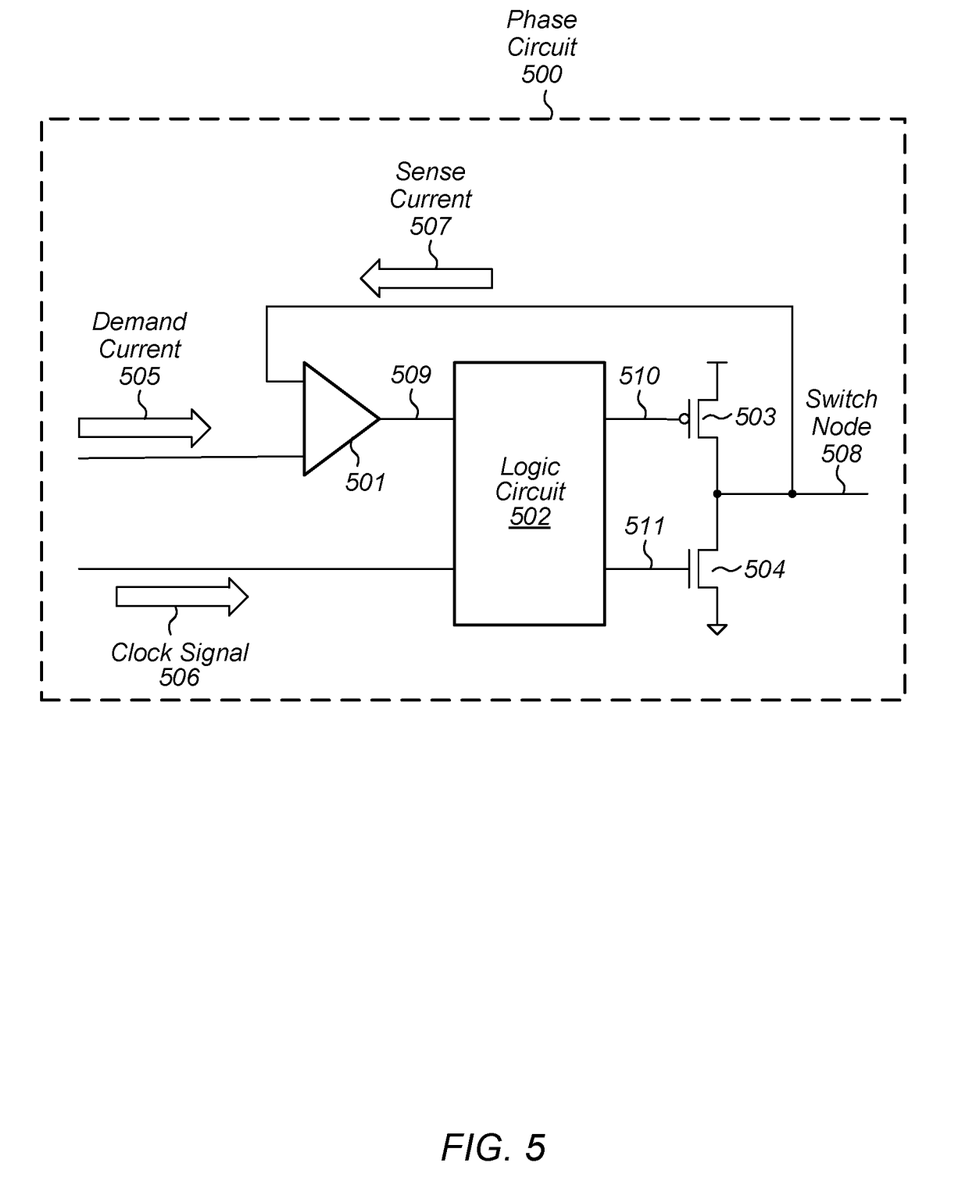
FIG. 5 is a block diagram of an embodiment of a phase circuit.

Phase circuits, such as those depicted in the embodiment of FIG. 1, may be designed according to various design styles. A particular embodiment of a phase circuit is depicted in FIG. 5. It is noted that phase circuit 500 may correspond to any of phase circuits 102A-102C as depicted in FIG. 1. As illustrated, phase circuit 500 includes comparator circuit 501, logic circuit 502, and devices 503 and 504. Device 503 is coupled between an input power supply node and switch node 508, while device 504 is coupled between switch node 508 and a ground supply node. It is noted that in various embodiments, switch node 508 may be coupled to any of inductors 104A-104C.

Device 503 may be a particular embodiment a p-channel MOSFET configured to source current to regulated power supply node 105 via switch node 508. Device 504 may be a particular embodiment of an n-channel MOSFET configured to sink current from regulated power supply node 105 via switch node 508. In various embodiments, a voltage level of node 510 may activate device 503, while a voltage level of node 511 may activate device 504.

Logic circuit 502 using clocks signal 506 and a voltage level of node 509 determine the voltage levels of nodes 510 and 511. In various embodiments, an assertion of clock signal 506 may result in a voltage level on node 510 sufficient to activate device 503, thereby allowing current to flow into switch node 508. It is noted that clock signal 506 may be generated by a control or other circuit coupled to power converter circuit 100. In some cases, each of phase circuits 102A-102C may have separate clock signals, while in other embodiments, each of phase circuits 102A-102C may share a common clock signal. The type of clock signal arrangement may be based, at least in part, on the selected operating mode of power converter circuit 100.

The current flowing into switch node 508 is sensed, generating sense current 507. Comparator circuit 501 is configured to generate a voltage level on node 509 that is based, at least in part, on a difference between sense current 507 and demand current 505. In various embodiments, demand current 505 may correspond, based on a selection of an operating mode of power converter circuit 100, to any of demand currents 107A-107C or to common demand current 109. For example, demand current 505 may correspond to any of demand currents 107A-107C when power converter circuit 100 is operating in a single-phase mode. Alternatively, demand current 505 may correspond to common demand current 109 when power converter circuit 100 is operating in a multi-phase mode.

Logic circuit 502 may be further configured, in response to an increase in a voltage level of node 509, to increase the voltage level of node 510 to deactivate device 503, and increase the voltage level of node 511 to activate device 504, thereby sinking a current from switch node 508. In this type of regulation, the duration of time phase circuit 500 is sourcing current to switch node 508 is variable based on a difference between demand current 505 and sense current 507. The duration of time phase circuit 500 is discharging current from switch node 508 is fixed and determined by the frequency of clock signal 506.

It is noted that the embodiment of phase circuit 500 depicted in FIG. 5 is an example of a possible implementation of a phase circuit that uses a particular mechanism for regulation of the voltage level on regulated power supply node 105. In other embodiments, phase circuit 500 may employ a fixed charging time determined by clock signal 506 or other suitable timing signal, and the time during which current is sunk from switch node 508 may be determined using sense current 507 and demand current 505.

Figure 6:
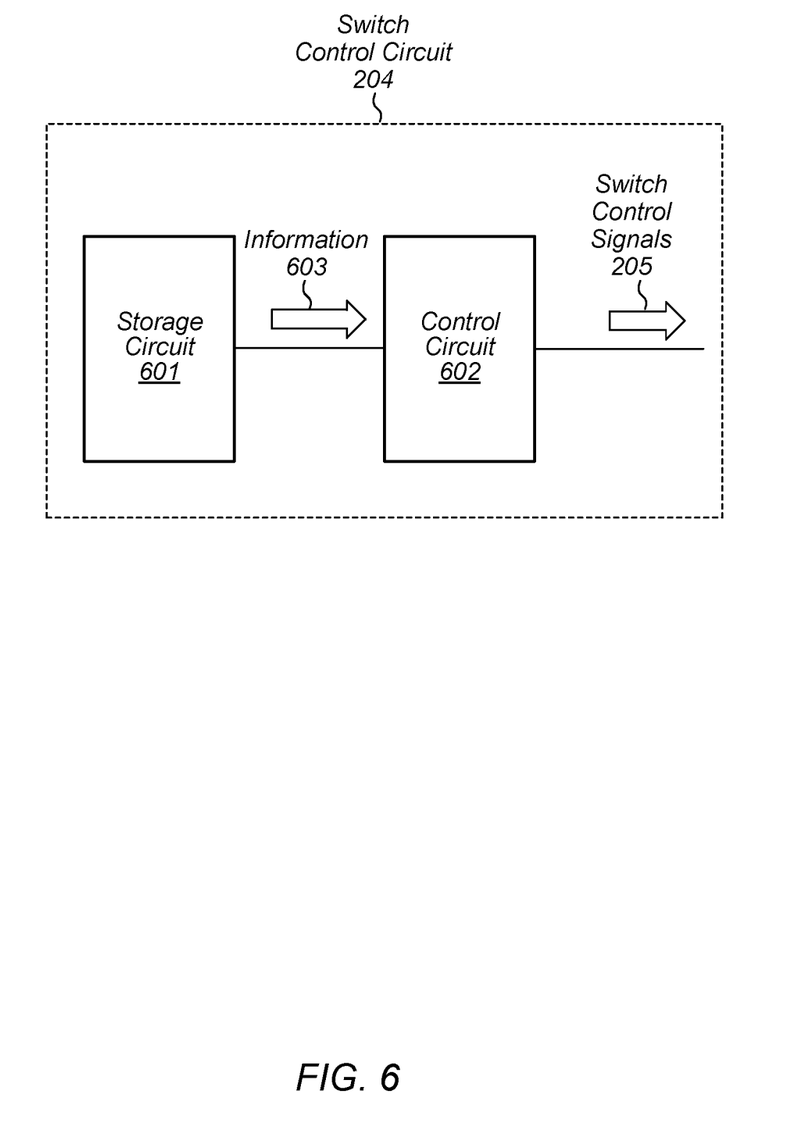
FIG. 6 is a block diagram of an embodiment of a switch control circuit.

A block diagram of an embodiment of switch control circuit 204 is depicted in FIG. 6. As illustrated, switch control circuit 204 includes storage circuit 601 and control circuit 602.

Storage circuit 601 may be a particular embodiment of a non-volatile memory circuit or one-time programmable memory circuit configured to store information 603. In various embodiments, information 603 may include multiple bits indicative of an operating mode, e.g., multi-phase operating mode, of power converter circuit 100. Alternatively, information 603 may be indicative of switch position settings for any of the switches includes in switch circuit 103.

Control circuit 701 is also configured to generate switch control signals 206 using information 603. In some cases, to generate the switch control signals 206, control circuit 701 may be further configured to modify a logic value of one or more of switch control signals 206. For example, control circuit 701 may change a logic value of a particular one of switch control signals 206 from a logical-0 to a logical-1.

Control circuit 701 may be any suitable combination of static logic circuits and sequential logic circuits. In some embodiments, control circuit 701 may be a particular embodiment of a general-purpose processor configured to execute program of software instructions to generate switch control signals 206 using information 603.

Figure 7:
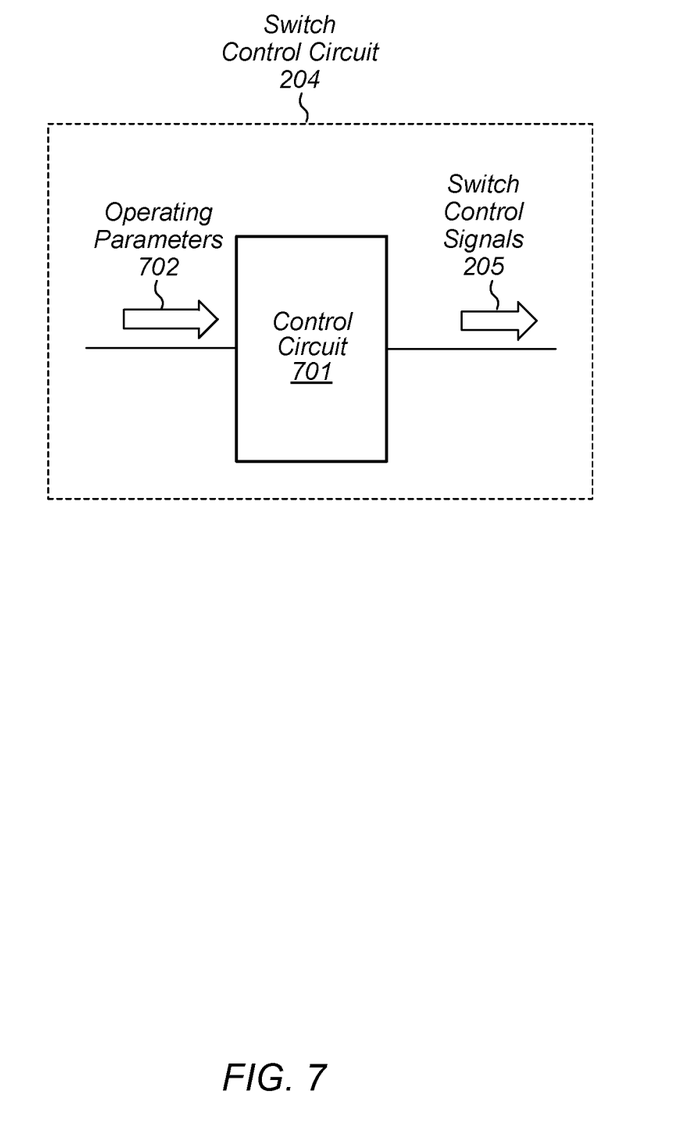
FIG. 7 is a block diagram of another embodiment of a switch control circuit.

A block diagram of another embodiment of switch control circuit 204 is depicted in FIG. 7. As illustrated, switch control circuit 204 includes control circuit 701, which is configured to receive operating parameters 702. In various embodiments, operating parameters 702 may include a temperature of a load circuit coupled to regulated power supply node 105, a frequency of a clock signal used by the load circuit, a level of activity of the load circuit, or any other suitable operating parameter. In some cases, operating parameters 702 may be determined by one or more sensor circuits (not shown) and information indicative of operating parameters 702 may be sent to control circuit 701 by the one or more sensor circuits.

Control circuit 701 is also configured to generate switch control signals 206 using operating parameters 702. In some cases, to generate the switch control signals 206, control circuit 701 may be further configured to modify a logic value of one or more of switch control signals 206. For example, control circuit 701 may change a logic value of a particular one of switch control signals 206 from a logical-0 to a logical-1.

Control circuit 701 may be any suitable combination of static logic circuits and sequential logic circuits. In some embodiments, control circuit 701 may be a particular embodiment of a general-purpose processor configured to execute program of software instructions to generate switch control signals 206.

Structures such as those shown in FIGS. 2-5 for generating a voltage level on a regulated power supply node may be referred to using functional language. In some embodiments, these structures may be described as including "a means for generating, using a reference voltage level and a voltage level of the regulated power supply node, respective ones of a plurality of demand currents on respective ones of a plurality of amplifier nodes," "a means for, in response to an activation of a multi-phase operating mode, shorting the plurality of amplifier nodes to generate a command demand current using the plurality of demand currents," and "a means for sequentially sourcing current to the regulated power supply node using the common demand current."

The corresponding structure for "means for generating, using a reference voltage level and a voltage level of the regulated power supply node, respective ones of a plurality of demand currents on respective ones of a plurality of amplifier nodes" is amplifier circuits 101A-101C, and their equivalents. Switch device 300, storage circuit 601, control circuit 602, control circuit 701, and their respective equivalents are the corresponding structure for "means for, in response to an activation of a multi-phase operating mode, shorting the plurality of amplifier nodes to generate a command demand current using the plurality of demand currents." The corresponding structure for "means for sequentially sourcing current to the regulated power supply node using the common demand current" is amplifier 501, logic circuit 502, device 503, device 504, and their equivalents.

Figure 8:
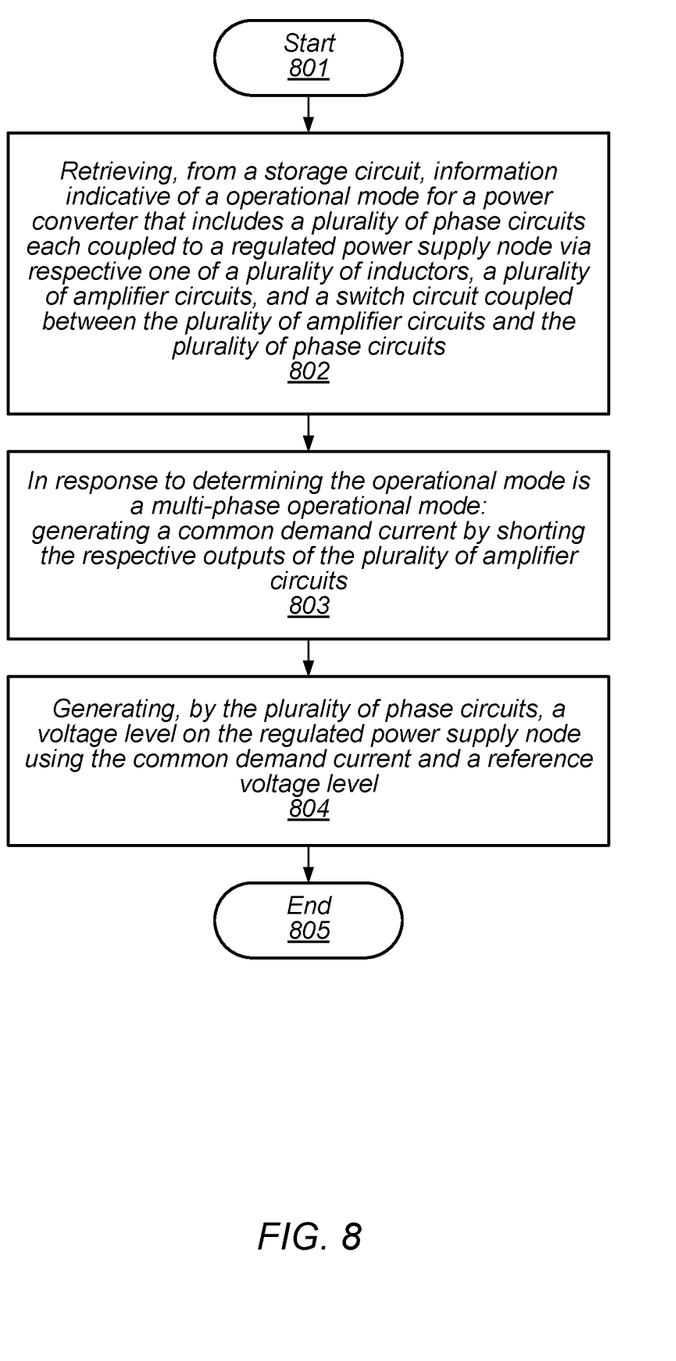
FIG. 8 depicts a flow diagram illustrating an embodiment of a method for operating a power converter circuit.

Turning to FIG. 8, a flow diagram depicting an embodiment of a method for operating a power converter circuit is illustrated. The method, which begins in block 801, may be applied to various power converter circuits, such as power converter circuit 100 as depicted in FIG. 1.

The method includes retrieving, from a storage circuit, information indicative of an operating mode for a power converter circuit (block 802). In various embodiments, the power converter circuit includes a plurality of phase circuits each coupled to a regulated power supply node via respective one of a plurality of inductors, a plurality of amplifier circuits, and a switch circuit coupled between the plurality of amplifier circuits and the plurality of phase circuits.

The method further includes, in response to determining the operating mode is a multi-phase operating mode: generating a common demand current by shorting the respective outputs of the plurality of amplifier circuits (block 803). In various embodiments, the switch circuit may include a plurality of switches including a particular switch coupled between a first output of a first amplifier circuit of the plurality of amplifier circuits and a second output of a second amplifier circuit of the plurality of amplifier circuits. In such cases, the method may further include generating a plurality of switch control signals using the information, and setting a position of at least one switch of the plurality of switches using the plurality of switch control signals.

In some embodiments, the method may also include modifying a value of a load capacitor coupled to the regulated power supply node using the plurality of switch control signals. In some cases, modifying the value of the load capacitor may include selectively coupling one or more capacitors to the regulated power supply node using the switch control signals. In various embodiments, the method may further include modifying respective values of a plurality of capacitors using the plurality of switch control signals, where each capacitor the plurality of capacitor is coupled to an output of a corresponding one of the plurality of amplifier circuits.

The method may, in some embodiments, also include monitoring one or more operating parameters of a load circuit coupled the regulated power supply node, and modifying the plurality of switch control signals using at least one of the one or more operating parameters. In various embodiments, the one or more operating parameters may include a temperature of the load circuit, a frequency of a clock signal used by the load circuit, a level of activity of the load circuit, and the like.

The method also includes generating, by the plurality of phase circuits, a voltage level on the regulated power supply node using the common demand current and a reference voltage level (block 804). In various embodiments, generating the voltage level on the regulated power supply node includes sequentially sourcing, by the plurality of phase circuits, respective ones of a plurality of source currents to the regulated power supply node via corresponding ones of a plurality of inductors.

In some embodiments, the method may, in response to determining the operating mode is a single-phase operating mode, include generating, by the plurality of amplifier circuits, a plurality of demand currents, and generating by the plurality of phase circuits, the voltage level on the regulated power supply node using the plurality of demand currents and the reference voltage level. In some cases, the method may also include generating, by the plurality of phase circuits, a plurality of sense currents and comparing each of the plurality of sense currents to a corresponding one of the plurality of demand currents. The method concludes in block 805.

Figure 9:
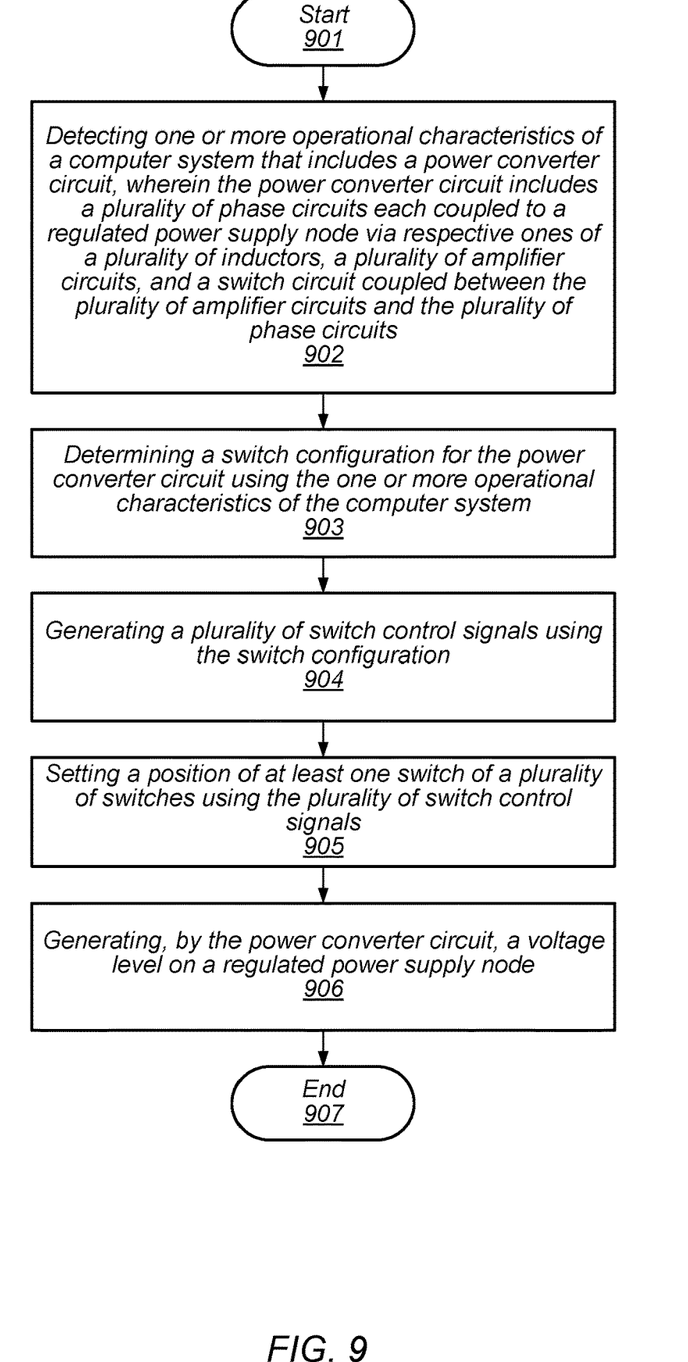
FIG. 9 depicts a flow diagram illustrating an embodiment of a method for adjusting switch settings for a power converter circuit.

Turning to FIG. 9, a flow diagram depicting an embodiment of a method for adjusting power converter circuit switch settings is illustrated. The method, which begins in block 901, may be applied to various power converter circuits, such as power converter circuit 100 as illustrated in FIG. 1.

The method includes detecting one or more operational characteristics of a computer system that includes a power converter circuit, wherein the power converter circuit includes a plurality of phase circuits each coupled to a regulated power supply node via respective ones of a plurality of inductors, a plurality of amplifier circuits, and a switch circuit coupled between the plurality of amplifier circuits and the plurality of phase circuits (block 902). In various embodiments, the operational characteristics may include frequencies of one or more clock signals included in the computer system, a temperature of the computer system, respective voltage levels of power supply nodes included in the computer system, and the like.

The method further includes determining a switch configuration for the power converter circuit using the one or more operational characteristics of the computer system (block 903). In some embodiments, determining the switch configuration includes determining whether a particular switch of a plurality of switches included in the power converter circuit is open or closed. The switch configuration may include positions for switches coupled to the output nodes the plurality of amplifier circuits as well as positions for switches included in capacitor loads circuits coupled to various nodes within the power converter circuit.

The method also includes generating a plurality of switch control signals using the switch configuration (block 904). In some cases, generating the plurality of switch control signals includes generation true and complement versions of at least one switch signal of the plurality of switch signals. The method further includes setting a position of at least one switch of a plurality of switches using the plurality of switch control signals (block 905). In some cases, setting the position of the at least one switch includes applying a particular voltage level to a control terminal of a MOSFET or other suitable transconductance device being used as a switching element. The particular voltage level may either result in the device conducting (i.e., a "closed switch") or result in the device being disabled (i.e., an "open switch").

The method also includes generating, by the power converter circuit, a voltage level on a regulated power supply node (block 906). Based on the operational characteristics, the power converter circuit may use the plurality of phase circuits in different operating modes to generate the voltage level on the regulated power supply node. For example, in some cases, the power converter circuit may operate the phase circuits independently of each other, while in other cases, the power converter circuit may operate the phase circuits sequentially. The method concludes in block 907.

Figure 10:
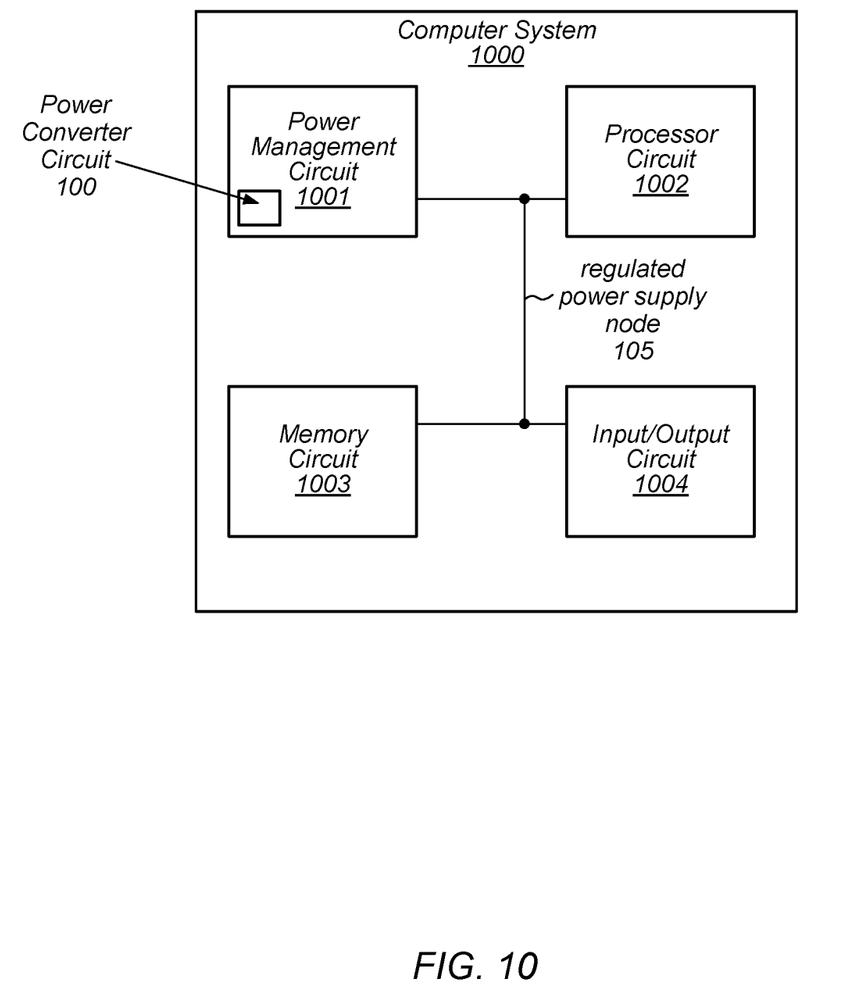
FIG. 10 illustrates a block diagram of a computer system.

A block diagram of computer system is illustrated in FIG. 10. In the illustrated embodiment, the computer system 1000 includes power management unit 1001, processor circuit 1002, memory circuit 1003, and input/output circuits 1004, each of which is coupled to regulated power supply node 105. It is noted that processor circuit 1002, memory circuit 1003, and input/output circuits 1004 may be referred to as "load circuits" that are coupled to a regulated power supply node 105. In various embodiments, computer system 1000 may be a system-on-a-chip (SoC) and/or be configured for use in a desktop computer, server, or in a mobile computing application such as, e.g., a tablet, laptop computer, or wearable computing device.

Power management unit 1001 includes power converter circuit 100 which is configured to generate a regulated voltage level on regulated power supply node 105 in order to provide power to processor circuit 1002, memory circuit 1003, and input/output circuits 1004. Although power management unit 1001 is depicted as including a single power converter circuit, in other embodiments, any suitable number of power converter circuits may be included in power management unit 1001, each configured to generate a regulated voltage level on a respective one of multiple internal power supply signals included in computer system 1000.

Processor circuit 1002 may, in various embodiments, be representative of a general-purpose processor that performs computational operations. For example, processor circuit 1002 may be a central processing unit (CPU) such as a microprocessor, a microcontroller, an application-specific integrated circuit (ASIC), or a field-programmable gate array (FPGA).

Memory circuit 1003 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 10, in other embodiments, any suitable number of memory circuits may be employed.

Input/output circuits 1004 may be configured to coordinate data transfer between computer system 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol.

Input/output circuits 1004 may also be configured to coordinate data transfer between computer system 1000 and one or more devices (e.g., other computing systems or integrated circuits) coupled to computer system 1000 via a network. In one embodiment, input/output circuits 1004 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1004 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of phase circuits coupled to a regulated power supply node via corresponding ones of a plurality of inductors;
a plurality of amplifier circuits configured to generate, using a reference voltage level and a voltage level of the regulated power supply node, respective ones of a plurality of demand currents on respective ones of a plurality of amplifier nodes;
a switch circuit coupled to the plurality of amplifier circuits and configured, in response to a selection of a multi-phase operating mode, to short the plurality of amplifier nodes to generate a common demand current using the plurality of demand currents; and
wherein the plurality of phase circuits are configured, in response to the selection of the multi-phase operating mode, to sequentially source current to the regulated power supply node, wherein each phase circuit is configured to use the common demand current.

2. The apparatus of claim 1, wherein the plurality of phase circuits are further configured, in response to a selection of a single-phase operating mode, to source current to the regulated power supply node, wherein each phase circuit is configured to use a respective one of the plurality of demand currents.

3. The apparatus of claim 1, further comprising a control circuit configured to generate a plurality of switch control signals using a determined operating mode.

4. The apparatus of claim 3, further comprising an output load circuit configured, using the plurality of switch control signals, to selectively couple one or more of a plurality of capacitors to the regulated power supply node.

5. The apparatus of claim 3, wherein the control circuit is further configured to determine an operating mode using information previously stored in a storage circuit.

6. The apparatus of claim 3, wherein the control circuit is further configured to determine an operating mode using one or more operating parameters associated with a load circuit coupled to regulated power supply node.

7. A method, comprising:
retrieving, from a storage circuit, information indicative of an operating mode for a power converter that includes a plurality of phase circuits each coupled to a regulated power supply node via respective one of a plurality of inductors, a plurality of amplifier circuits, and a switch circuit coupled between the plurality of amplifier circuits and the plurality of phase circuits;
in response to determining the operating mode is a multi-phase operating mode:
generating a common demand current by shorting respective outputs of the plurality of amplifier circuits; and
generating, by the plurality of phase circuits, a voltage level on the regulated power supply node using the common demand current and a reference voltage level.

8. The method of claim 7, wherein the switch circuit includes a plurality of switches including a particular switch coupled between a first output of a first amplifier circuit of the plurality of amplifier circuits and a second output of a second amplifier circuit of the plurality of amplifier circuits, and wherein the method further comprises:
generating a plurality of switch control signals using the information; and
setting a position of at least one switch of the plurality of switches using the plurality of switch control signals.

9. The method of claim 8, further comprising, modifying a value of a load capacitor coupled to the regulated power supply node using the plurality of switch control signals.

10. The method of claim 8, further comprising, modifying respective values of a plurality of capacitors using the plurality of switch control signals, wherein each capacitor of the plurality of capacitors is coupled to an output of a corresponding one of the plurality of amplifier circuits.

11. The method of claim 8, further comprising:
monitoring one or more operating parameters of a load circuit coupled to the regulated power supply node; and
modifying the plurality of switch control signals using at least one of the one or more operating parameters.

12. The method of claim 7, further comprising, in response to determining the operating mode is a single-phase operating mode:
generating, by the plurality of amplifier circuits, a plurality of demand currents; and generating, by the plurality of phase circuits, the voltage level on the regulated power supply node using the plurality of demand currents and the reference voltage level.

13. The method of claim 12, further comprising:
generating, by the plurality of phase circuits, a plurality of sense currents; and
comparing each of the plurality of sense currents to a corresponding one of the plurality of demand currents.

14. An apparatus, comprising:
a load circuit including a power terminal coupled to a regulated power supply node;
a storage circuit configured to store information indicative of an operating mode;
a power converter circuit including a plurality of amplifier circuits, and a plurality of phase circuits, wherein the power converter circuit is configured to:
retrieve the information from the storage circuit;
in response to determining the operating mode is a multi-phase operating mode:
short respective outputs of the plurality of amplifier circuit to generate a common demand current; and
generate a voltage level on the regulated power supply node using the common demand current and a reference voltage level.

15. The apparatus of claim 14, wherein the power converter circuit further includes a plurality of switches including a particular switch coupled between a first output of a first amplifier circuit of the plurality of amplifier circuits and a second output of a second amplifier circuit of the plurality of amplifier circuits, and wherein the power converter circuit is further configured to:
generate a plurality of switch control signals using the information; and
set a position of at least one switch of the plurality of switches using the plurality of switch control signals.

16. The apparatus of claim 15, wherein the power converter circuit is further configured to modify a value of a load capacitor coupled to the regulated power supply node using the plurality of switch control signals.

17. The apparatus of claim 15, wherein the power converter circuit includes a plurality of capacitors including a particular capacitor coupled to an output of a corresponding one of the plurality of amplifier circuits, and wherein the power converter circuit is further configured to modify respective values of a plurality of capacitors using the plurality of switch control signals.

18. The apparatus of claim 15, wherein the power converter circuit is further configured to:
monitor one or more operating parameters of the load circuit; and
modify the plurality of switch control signals using at least one of the one or more operating parameters.

19. The apparatus of claim 14, wherein the power converter circuit is further configured, in response to a determination that the operating mode is a single-phase operating mode, to:
generate a plurality of demand currents; and
generate the voltage level on the regulated power supply node using the plurality of demand currents and the reference voltage level.

20. The apparatus of claim 19, wherein the power converter circuit is further configured to:
generate a plurality of sense currents; and compare each of the plurality of sense currents to a corresponding one of the plurality of demand currents.

\* \* \* \* \*